UNITED STATES PATENT OFFICE.

HANS A. FRASCH, OF HAMILTON, CANADA.

METHOD OF MAKING CAUSTIC ALKALI.

SPECIFICATION forming part of Letters Patent No. 688,463, dated December 10, 1901.

Application filed August 7, 1901. Serial No. 71,207. (No specimens.)

*To all whom it may concern:*

Be it known that I, HANS A. FRASCH, a citizen of the United States, residing at Hamilton, in the county of Wentworth and Province of Ontario, Canada, have invented certain new and useful Improvements in Processes of Producing Caustic Alkali, of which the following is a full, clear, and exact description.

This invention relates to a process and method of producing caustic alkali from sodium or potassium salts.

In a concurrent application filed by me, as well as in a prior patent granted to me under date of March 12, 1901, No. 669,899, I set forth the separation of a nickel-ammonium salt. I find that this salt being insoluble in ammoniated-salt brine can be utilized for the manufacture of caustic soda or potassium, nickel hydroxid being used as the means to bring about the reaction by the following formula:

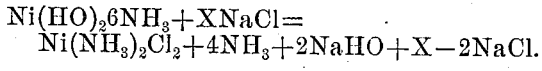

The nickel-ammonium salt being insoluble in ammoniated-salt brine precipitates as described in my said concurrent application. This salt is separated by means of filtration or otherwise from the remaining salt brine and sodium hydrate and is reconverted to the hydrate according to the following formula:

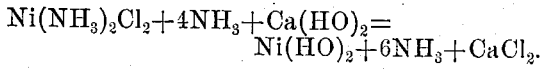

This reaction taking place in presence of water, upon boiling the ammonia is recovered in anhydrous form, while the nickel is recovered by means of filtration in the form of nickel hydroxid, both of which are again used over, as stated above.

In place of nickel hydroxid nickel oxid may be used for obtaining the initial ammoniacal solution; also, the hydroxid of cobalt may be used in place of nickel, the resulting reactions remaining the same, or any other hydroxid of a metal which is capable of forming an ammonium double salt which is insoluble in ammoniated-salt brine may be used.

To carry out the invention, nickel hydroxid is treated with a solution of ammonia, and a solution of nickel-ammonium hydrate is thereby obtained. To this solution, then, sodium chlorid is added until all the nickel is precipitated from the solution in the form of nickel-ammonium chlorid. The nickel-ammonium chlorid is separated from the residual solution by means of filtration and mixed with lime-milk containing sufficient calcium hydrate to take care of the chlorin contained therein, the free ammonia being distilled off by the application of heat, while the nickel hydroxid is separated by suitable means from the waste liquor. The ammonia is again used to dissolve fresh quantities of nickel hydroxid.

The solution of sodium chlorid containing the caustic soda may be subjected to repeated treatment and the sodium hydrate thereby concentrated until reaction ceases, when the sodium hydrate is further concentrated by means of heat, the sodium chlorid yet present being separated by means of crystallization.

In place of sodium chlorid potassium chlorid may be used, and potassium hydrate may be produced by the same means.

In place of using the oxids of nickel or cobalt the carbonate may be used, if it is desired to obtain sodium carbonate instead of caustic soda.

What I claim is—

1. The process of producing alkali, consisting in allowing the hydroxid of a metal to react upon the salt of an alkali in presence of ammonia.

2. The process of producing alkali, consisting in the reaction of the hydroxid of nickel upon an alkaline salt in presence of an excess of ammonia.

3. The process of producing caustic soda, consisting in the reaction of nickel hydroxid upon sodium chlorid in presence of an excess of ammonia.

4. The process of producing caustic soda, consisting in the reaction of nickel hydroxid upon sodium chlorid in presence of an excess of ammonia and water, thereby producing nickel-ammonium chlorid and a solution of caustic soda, and separating the nickel-ammonium chlorid from the caustic-soda solution by suitable means.

5. The process of producing alkali, consisting in the reaction of nickel hydroxid upon a solution of a salt of an alkali in presence of an excess of ammonia, separating the nickel-ammonium salt thereby obtained from the caustic alkali by suitable means and recovering the ammonia and nickel hydroxid by the addition of calcium hydrate.

In testimony whereof I have hereunto set my hand this 6th day of August, A. D. 1901.

HANS A. FRASCH.

Witnesses:
A. M. HERRIMAN,
F. R. GRAHAM.